June 21, 1960  R. A. C. FOSBERRY ET AL  2,941,631
VIBRATION DAMPING DEVICES FOR USE WITH DRUM BRAKES
Filed March 4, 1957  2 Sheets-Sheet 1

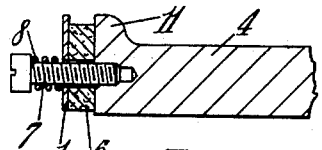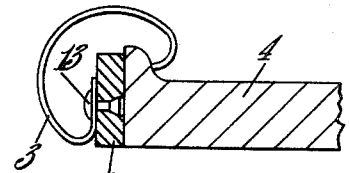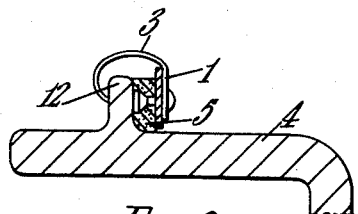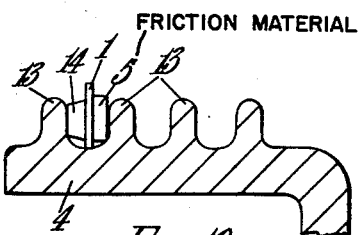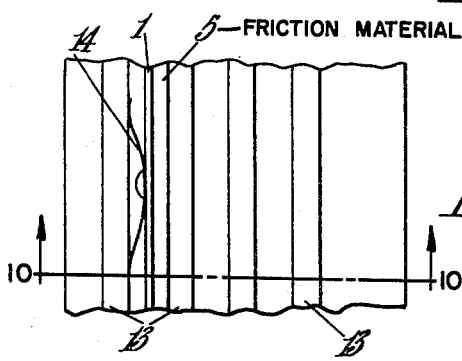

United States Patent Office 2,941,631
Patented June 21, 1960

2,941,631

VIBRATION DAMPING DEVICES FOR USE WITH DRUM BRAKES

Ronald Alfred Caleb Fosberry and Zbigniew Holubecki, both of Nuneaton, England, assignors to National Research Development Corporation, London, England Filed Mar. 4, 1957, Ser. No. 643,857

Claims priority, application Great Britain Mar. 7, 1956

2 Claims. (Cl. 188—218)

This invention relates to vibration damping devices for use with drum brakes and has for its main objective to provide an improved form of vibration damping device for substantially preventing or materially reducing the generation of objectionable vibratory noises such as "squeal" in drums of this character.

The invention accordingly consists in a vibration damping device for use with drum brakes comprising a damper member held in contact with and capable of limited movement relative to the brake drum, the area of contact between the damper and the brake drum being so disposed relative to the axis of rotation of the drum that frictional forces opposing relative movement between the brake drum and the damper serve to apply damping to radial vibrations of the drum.

According to the preferred arrangement, the area of contact between the damping member and the drum is disposed in a plane or planes substantially perpendicular to the axis of rotation of the drum, and the damping member comprises a ring which is held in contact with the brake drum by one or more springs or clips which are adapted to engage with an annular flange or rib on the drum, the damping ring being formed from a plurality of sections of arcuate shape pivotally secured together by interconnecting parts to form a complete annulus, and a layer of friction material being provided for giving additional friction damping forces at the contact area and being attached either to the ring or to the brake drum.

The invention will be more completely understood from the following detailed description which is given in conjunction with the accompanying drawings, in which:

Figure 7 is a partial section as in Figure 3 showing an alternative form of spring mounting;

Figure 8 is a partial section as in Figure 3 showing an arrangement in which the material of the ring is used as the friction material;

Figure 9 is a partial section as in Figure 3 showing a method of fitting a damper to a single-ribbed drum;

Figure 10 is a partial section as in Figure 2 showing a method of fitting a damper to a multi-ribbed drum; and Figure 11 is a partial sectional plan view of the arrangement shown in Figure 10 and shows a method of mounting the necessary springs.

Figures 1, 2:
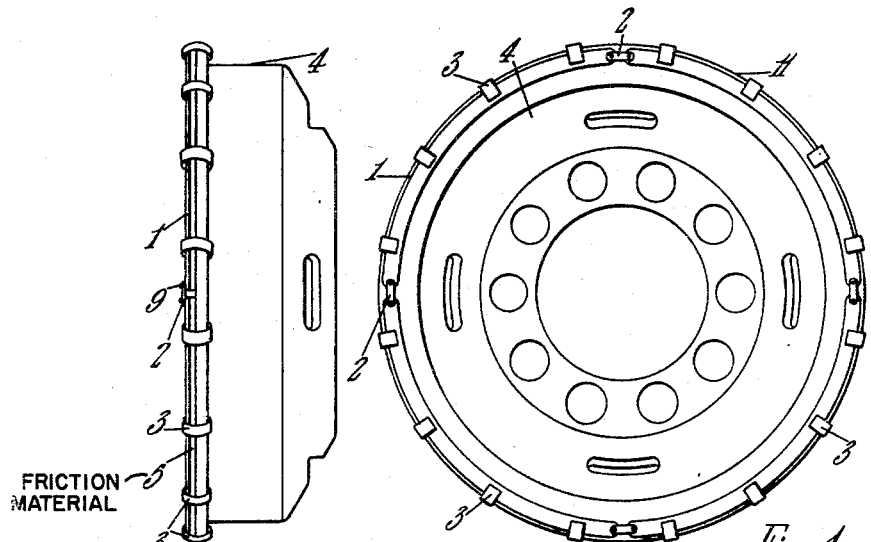
Figures 1 and 2 are front and side views of a lipped brake drum showing a vibration damping device according to the invention in position thereon.
Figure 3:
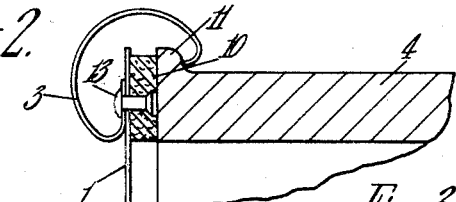
Figure 3 is a partial sectional view of the arrangement shown in Figure 1.
Figure 4:
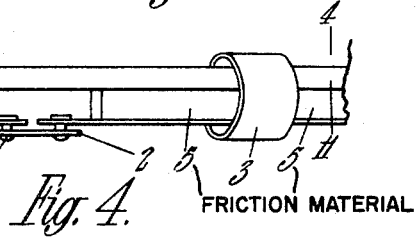
Figure 4 is a partial plan view of the arrangement shown in Figure 1.

Referring first to Figures 1, 2, 3 and 4, the damping device is constructed in the form of a metal ring 1 of thin rectangular section divided into four sections or parts hingedly or pivotally connected together by means of small interconnecting link members 2, the rivets or screws 9 which join these parts allowing free rotation of one relatively to another. This metal ring is provided with a layer of friction material 5 on its inner surface and is so dimensioned as to engage with the peripheral part 10 of the end face of the brake drum 4 so that when the metal ring 1 is placed in position, it makes contact with a peripheral annular part of the drum surface which is substantially perpendicular to the axis of rotation of the drum. Conveniently, the drum 4 has an annular flanged lip or rib 11 projecting radially outwards just behind the end face with which the friction material of the damping ring member makes contact and the damping ring 1 is held in position by a plurality of spring clips 3 which are attached to the damping ring 1 by rivets or bolts 13 or other suitable means and engage with the flange or rib 11 in the form of clamps so as to secure the ring 1 firmly to the brake drum 4 with the friction material 5 squeezed between the two surfaces.

Figure 5:
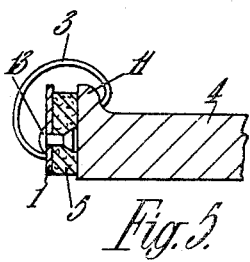
Figure 5 is a partial section as in Figure 3 but showing a modified method of securing the spring clip in position.
Figure 6:
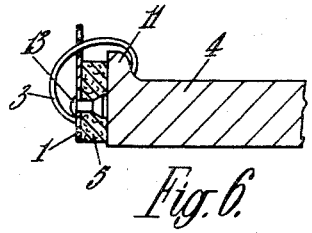
Figure 6 is a partial section as in Figure 5 showing a design to give greater protection to the clip.

In the modification shown in Figure 5, the spring clips 3 instead of being attached to the damping ring 1 may be simply clipped over the edges of the ring and the flange or rib 11 on the brake drum and held in place by their own tension, while if preferred, these spring clips 3 may be arranged to pass through holes or slots in the damping ring 1 as shown in Figure 6.

In the modification shown in Figure 7, the damping devices may be held in place by bolts 7 which pass through the damping ring 1 and the friction material 5 and engage in threaded holes tapped in the brake drum lip 11, each bolt being provided with a spring or spring washer 8 disposed between the head of the bolt and the damping ring so that this spring exerts a pressure on the damping ring which can be tensioned by adjusting the bolt. It will be understood that the hinge pieces act largely as structure members to resist the centrifugal forces when using clips which engage an annular flange or rib; thus when the damping device is held by bolts screwed into the drum the hinges may be omitted. Further, in such cases it will be appreciated that the parts of the ring need not cover the whole of the periphery and only as many need be used as will reduce the squeal to an acceptable level.

In the modification shown in Figure 8, the ring 1 is secured directly to the brake drum 4 without any additional layer of friction material, and with such an arrangement, the ring is of thicker section and may be divided into more than four parts.

In the modification shown in Figure 9, the drum 4 is provided with a single peripheral rib 12, and in this case the damping ring is secured to such rib by a set of spring clips 3 which engage with the rib in the manner shown.

In Figures 10 and 11, the drum is provided with a plurality of ribs 13, and in this case the damping ring 1 with the friction material 5 is disposed between a pair of ribs 13 held in place by a plurality of spring members 14 disposed between the damping ring 1 and one rib so that the damping ring 1 and friction material 5 is pressed against the other rib.

It will thus be seen that with any of the arrangements hereinbefore described, a constant force or pressure is provided between the damping ring and the contact area of the brake drum so that this force or pressure operates in a direction substantially parallel to the axis of rotation of the drum and is distributed over an annular contact area which lies in a plane substantially perpendicular to that axis and that any consequent damping is applied to both tangential and radial vibrations. Because of the flexibility of the springs, slight wear of the damper as may occur in service will not substantially reduce the spring pressure, nor will expansion of the drum, due to heat, cause undue strain of the damper.

It will be understood, however, that while a damping ring divided into four sections is preferred, this number may be varied according to the size of the ring and other prevailing conditions in order that the most effective results may be obtained.

It will also be appreciated that this division of the ring into sections is advantageous for assembly on a vehicle and contributes to the damping properties on account of the fact that it is possible to choose a number of sections so that this number is different from the number of nodes in the likely modes of vibration of the drum.

We claim:

1. Vibration damping device for use with drum brakes comprising a brake drum having a peripheral flange, a damper member of annular form, and means for holding said damper member in contact with a part of said peripheral flange disposed in a plane substantially perpendicular to the axis of rotation of the drum, said annular member being formed from a plurality of sections of arcuate shape pivotally secured together by interconnecting parts to form a complete annulus.

2. Vibration damping device for use with drum brakes comprising a brake drum having a peripheral flange on the outer edge of the drum, a damper member of annular form, and resilient means for holding said damper member in contact with a part of the surface of the flange which is disposed in a plane substantially perpendicular to the axis of rotation of the drum, said annular member being formed from a plurality of sections of arcuate shape pivotally secured together by interconnecting parts to form a complete annulus, and said resilient means comprising a plurality of spring clips embracing said damper member and said peripheral flange and forming a resilient clamping connection therebetween.

References Cited in the file of this patent
UNITED STATES PATENTS

| | | |
|---|---|---|
| 1,791,495 | Frey | Feb. 10, 1931 |
| 1,833,413 | Chose | Nov. 24, 1931 |
| 1,846,257 | Huck | Feb. 23, 1932 |
| 1,984,577 | Griswold | Dec. 18, 1934 |
| 2,012,838 | Tilden | Aug. 27, 1935 |
| 2,079,227 | Sarazin | May 4, 1937 |
| 2,185,017 | Purvis | Dec. 26, 1939 |
| 2,197,583 | Koeppen et al. | Apr. 16, 1940 |
| 2,349,658 | Horn | May 23, 1944 |
| 2,639,195 | Bock | May 19, 1953 |
| 2,669,130 | Shell | Feb. 16, 1954 |
| 2,790,523 | Fawick et al. | Apr. 30, 1957 |